United States Patent [19]

Katayama

[11] Patent Number: 4,974,901
[45] Date of Patent: Dec. 4, 1990

[54] WINDOW MOLDING

[75] Inventor: Kenji Katayama, Anjyo, Japan

[73] Assignee: Inoue MTP Kabushiki Kaisha, Nagoya, Japan

[21] Appl. No.: 525,214

[22] Filed: May 21, 1990

Related U.S. Application Data

[63] Continuation of Ser. No. 246,723, Sep. 20, 1988, abandoned.

[30] Foreign Application Priority Data

Sep. 22, 1987 [JP] Japan .................................. 62-145196
Jan. 20, 1988 [JP] Japan ..................................... 63-5468

[51] Int. Cl.⁵ ................................................ B60J 1/02
[52] U.S. Cl. ................................ 296/201; 296/96.21; 296/213; 52/716
[58] Field of Search ...................... 296/201, 93, 96.21, 296/154, 208, 213; 49/476; 52/716, 717, 208, 209, 397, 400, 402, 403, 533, 534

[56] References Cited

U.S. PATENT DOCUMENTS 4,434,593  3/1984  Horike et al. ................. 296/96.21 X
4,441,755  4/1984  Endo et al. ........................ 52/400 X
4,458,459  7/1984  Irrgang ............................. 52/400 X
4,700,525  10/1987 Nieboer et al. .................... 52/397 X
4,833,847  5/1989  Inayama et al. ................ 296/201 X

FOREIGN PATENT DOCUMENTS 2120055  11/1971  Fed. Rep. of Germany ........ 296/93
3046457   7/1982  Fed. Rep. of Germany ...... 296/213
3413003  10/1985  Fed. Rep. of Germany ... 296/96.21
282116   12/1986  Japan .................................. 296/93

Primary Examiner—Margaret A. Focarino
Assistant Examiner—Joseph D. Pape
Attorney, Agent, or Firm—Armstrong, Nikaido, Marmelstein, Kubovcik & Murray

[57] ABSTRACT

A window molding having an external portion which covers a gap formed in a connecting portion between a vehicle body panel and a window glass of a vehicle to which the window molding is to be mounted, a securing leg portion which is integral with the external portion to be inserted in the gap, and a plate portion which extends between the leg portion and the vehicle body panel and which has a bent end to be engaged by the vehicle body panel to define a trough.

11 Claims, 2 Drawing Sheets

WINDOW MOLDING

This application is a continuation division of application Ser. No. 246,723 filed Sept. 20, 1988, now abandoned.

BACKGROUND OF THE INVENTION

1. Field of the Invention

The present invention relates to a window molding for an automobile and more precisely it relates to a window molding which serves as a rain gutter.

2. Description of the Related Art

Generally, on opposite sides of a roof of an automobile are provided gutters in which the rainwater flows therealong. However, no gutter is provided at the conjunction with the front and the rear windows, so that the rain falling on the roof partly falls down on and along the window glasses of the front and the rear windows. During the travel of the automobile, a large part of the rainwater which falls on the automobile body is collected onto the window glass of the rear window.

However, the rainwater falling on and along the rear window glass worsens the rear field of view of a driver through a rearview mirror.

It is known to provide projections which extend upward toward the roof on window moldings which cover the connecting portions between the vehicle body and the window glasses in order to receive the rainwater falling from the roof in a gutter defined by the projections, as disclosed for example in Japanese Unexamined Utility Model Publication No. 55-36037.

However, such projections provided on the moldings are undesirable from the viewpoint of safeness and cause an undersirable wind noise.

The primary object of the present invention is therefore to provide an improved safe window molding which can prevent the rain on the roof from falling down on the rear window glass and can prevent the occurence of the wind noise.

Another object of the present invention is to provide a window molding which can be attached to the vehicle body so as to follow the curved profiles of the window frames without causing undesirable deflection etc.

SUMMARY OF THE INVENTION

To achieve the objects mentioned above, according to the present invention, there is provided a window molding which has an external portion which covers a gap formed in a connecting portion between a vehicle body panel and a window glass which is directly adhered to the vehicle body panel by a structural adhesive, and a securing leg portion which is integral with the external portion to be inserted in the gap, the improvement comprising a plate portion which extends between the leg portion and the vehicle body panel and which has a bent end to be connected to the vehicle body panel to define a groove.

BRIEF DESCRIPTION OF THE DRAWINGS

The invention will be explained in detail below with reference to the accompanying drawings, in which.

DETAILED DESCRIPTION OF EMBODIMENTS

Figure 1:
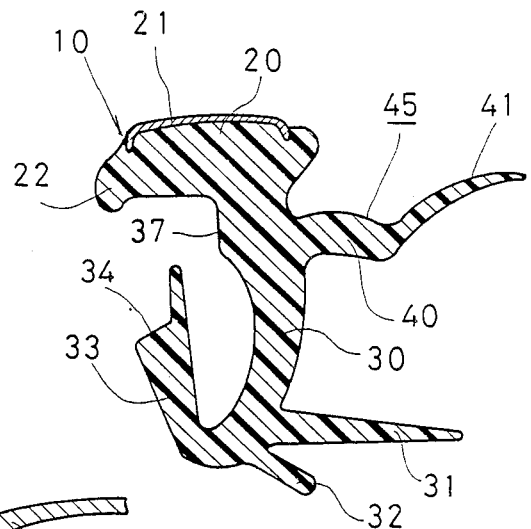
FIG. 1 is a sectional view of a window molding according to a first embodiment of the present invention.

A window molding 10 shown in FIG. 1 comprises an extrusion made of plastics, such as non-rigid vinyl chrolide resin or the like and has an external portion 20 and a leg portion 30 which integrally hangs from the external portion.

(First Embodiment)

Figure 2:
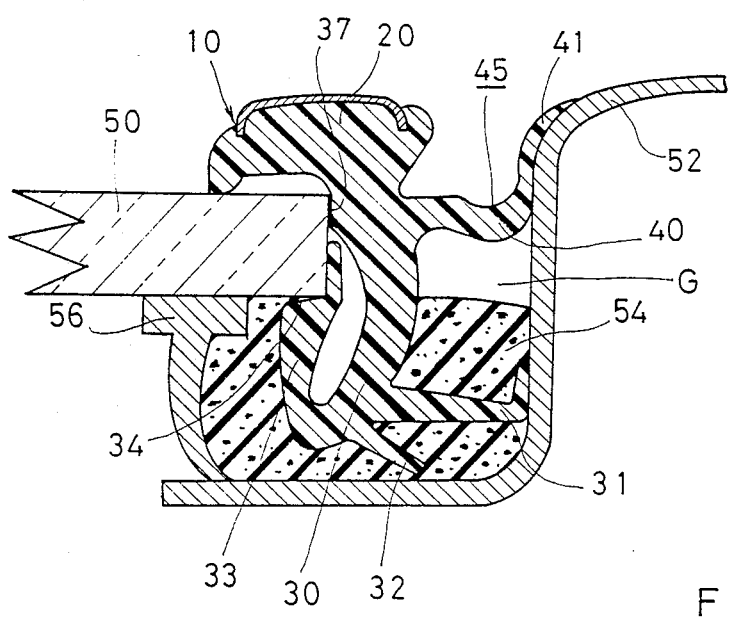
FIG. 2 is a sectional view of a window molding shown in FIG. 1, attached to a vehicle body.

The external portion 20 is adapted to cover a gap G which is formed in a connecting portion between a window glass 50 and a panel 52 of a vehicle body (FIGS. 1 and 2). Accordingly, the external portion 20, when mounted to the vehicle body, is visibly exposed, so that the external portion 20 is usually provided, on its external surface, with a decorative member 21, such as a decorative band which is subject to metal vaporization. Note that the decorative member 21 is optional.

The external portion 20 has at its front end adjacent to the window glass 50 an abutment (or projection) 22 which is bent downward toward the window glass so as to come into elastic contact with the glass 50.

The securing leg portion 30 can be inserted in the gap G, so that the lower end thereof can be secured in the gap by an adhesive 54 with which the large part of the gap G is filled so as to keep a desired posture and position of the window molding 10. The securing leg portion 30 has at its lower end fin-like legs 31 and 32 extending toward the body panel 52 and a bent end 33 which is bent upward on the side adjacent to the window glass 50. The bent end 33 is provided, on its front end, with a stepped abutment 34 which can be engaged by the inner edge of the window glass 50.

On the upper end of the securing leg portion 30 is provided an integral plate 40 which extends substantially at right angle from the leg portion 30 toward the body panel 52 and which is provided, on its front end, with an upwardly bent abutment 41 which can come into elastic abutment with the body panel 52. The plate 40 defines a generally U-shaped groove (channel) 45 together with the side face of the external portion 20 and the abutment 41. The groove 45 which has an open upper end defines a gutter for rainwater.

Preferably, the securing leg portion 30 is provided, on its side far from the plate 40, with a surface contacting portion 37 which substantially extends perpendicular to the lower surface of the external portion 20 which lies in a plane substantially parallel with the glass plane, so that the surface contacting portion 37 can be brought into close surface contact with the end face of the window glass 50.

When the window molding 10 is mounted to the vehicle body, as shown in FIG. 2, the leg portion 30 is inserted in the gap G between the glass 50 and the body panel 52, so that the lower end of the leg portion 30 is embedded in the adhesive 54 for establishing the adhesion between the window glass 50 and the body panel 52. As a result, the leg portion 30 can be firmly secured to the window glass 50 and the body panel 52.

When the leg portion 30 is inserted in the gap G, the leg 31 located on the side thereof adjacent to the body panel 52 comes into contact with the internal surface of the body panel, so that the lower end of the leg portion is pressed and deformed toward the opposite side, i.e. toward the window glass 50, resulting in a press abutment of the stepped abutment 34 against the end face of the window glass 50. The bent end 41 of the plate 40 comes into press contact with the body panel 52, so that the window molding is entirely biased toward the window glass 50. Thus, the generally U-shaped groove (gutter) 45 is formed by the bent end 41, the plate 40, and the side face of the external portion 20.

The rainwater on the body panel can flow in and along the gutter(s) which is (are) defined between the body panel and the window glass(es) by the groove(s) 45 substantially without falling on the window glass(es). The groove 45 is connected to drains (not shown) which are provided, for example, on the peripheral edges of a trunk of an associated vehicle on the opposite lower ends of the window, so that the rainwater can be discharged from the drains.

As can be understood from the foregoing, according to the present invention, the rainwater on the roof is introduced into the gutters defined by the grooves which are formed by the window moldings of the present invention substantially without running down on and along the window glass, and is then discharged out from the drains. Therefore, according to the present invention, a clear rear view of a driver through a rearview mirror can be ensured. Furthermore, since the window molding according to the present invention has no projection unlike the prior art mentioned hereinbefore, the molding is safe and does not cause wind noise.

In the illustrated embodiment, the molding 10 has a generally J-shaped cross section. However, the sectional shape of the molding is not limited to that shown in the drawings, and can be any other shape, such as generally T-shape or the like.

(Second Embodiment)

Figure 3:
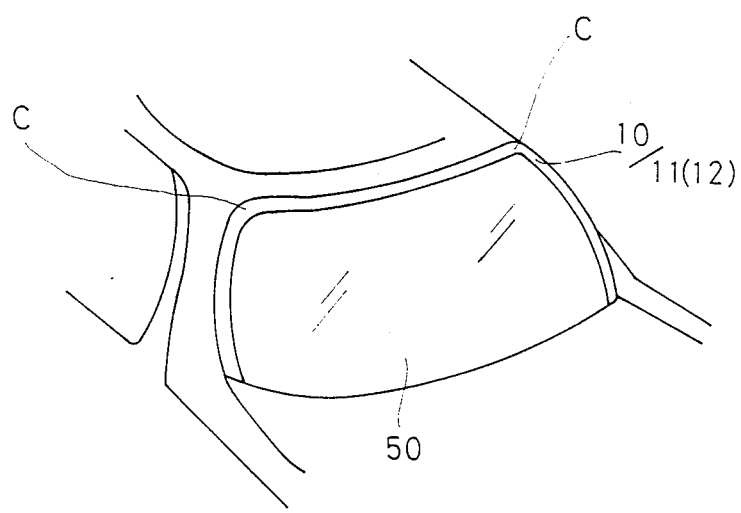
FIG. 3 is a perspective view of a rear window of an automobile.

As can be seen in FIG. 3, usually, the window glass 50 to which the window molding is applied is substantially in the form of a rectangle with round corners, and accordingly, the molding 10 must be deformed at the upper round corners C of the generally rectangular window glass into a desired curved shape corresponding to the round corners. If the molding is curved about the leg portion thereof, the bent end 41 of the plate 40 which is located on the outerperipheral side with respect to the leg portion is subject to a tensile force, so that the bend end 41 tends to bend backward due to the selfresistance against the tensile force. The deformation (backward bending) takes place toward the inward of the groove 45, so that the width of the groove 45 is reduced or, in the worst case, the groove is completely closed. In addition to the foregoing, there is a possibility that an undesirable gap is produced between the window glass and the body panel at the corners C of the window glass.

The window molding according to the second embodiment solves the above-mentioned problem of the backward bending of the bent end of the molding at the corner portions of the window glass. The plate 40 of the window molding 11 has at its front end a fin-like lower projection 42 in addition to the fin-like upper projection (bent end) 41, so that the plate 40 forms, together with the upper and lower projections 41,42, the side portions of the leg portion 30 and the external portion 20, a generally H-shaped profile, as shown in FIG. 4.

Figure 4:
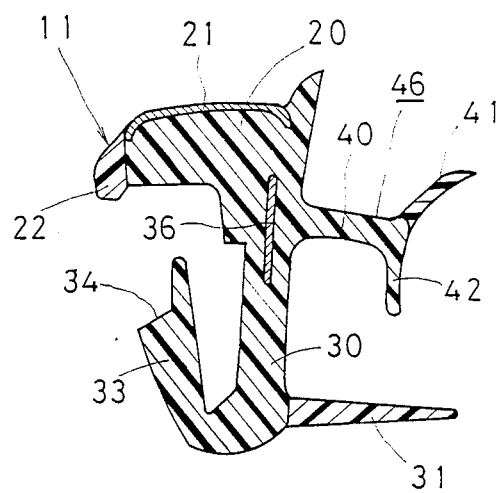
FIG. 4 is a sectional view of a window molding according to another embodiment of the present invention.

The window molding 11 shown in FIG. 4 has the external portion 20 and the securing leg portion 30 which is provided with the plate 40 to define the groove 46 (gutter). The plate 40 has the upper and lower projections 41 and 42, as mentioned above to provided a generally H-shaped profile. In FIG. 4, the elements corresponding to those of the window molding 10 of the above-mentioned first embodiment are designated with the same numerals. Numeral 36 designates a reinforcing metal core embedded in the leg portion 30.

In the window molding 11 shown in FIG. 4, the abutment 22 of the external portion 20 which comes into contact with the window glass is made of a resin material softer than a resin material of which the remaining portion of the window molding is made. Preferably, the upper projection 41 and the fin-like leg 31 are also made of a softer resin material.

The upper projection 41 has a thickness decreasing toward the free end thereof and is bent outward toward the body panel 52 at its free end, so that when the window molding 11 is mounted to the vehicle body, the plate 40, the side portion of the external portion (and the leg portion), and the upper projection 41 define the generally U-shaped groove 46 width of which gradually increases upward.

The lower projection 42 extends substantially in the direction opposite to the upper projection 41, so that the width of the groove defined by the lower projection 42 is substantially identical to or slightly smaller than the width of the groove 46 defined by the upper projection 41. When the window molding is bent at the corner portions C (FIG. 3) of the window glass 50, the backward bending of the upper projection 41 toward the inside of the groove 46 can be prevented or restricted by the bending of the lower projection 42 toward the leg portion. The bending of the lower projection 42 in the same direction as the bending of the upper projection 41 gives a resistant force in the opposite direction to the upper projection 41, so that the upper projection 41 can be prevented from separating from the body panel 52.

If the upper projection 41 is relatively thin, it is preferable to make the plate 40 and the lower projection 42 of relatively hard plastics same as the material of the leg portion 20 and to make the upper projection 41 of nonrigid plastics softer than the hard plastics mentioned above in order to fulfil the function of the lower projection more effectively, as shown in FIG. 4.

Figure 6:
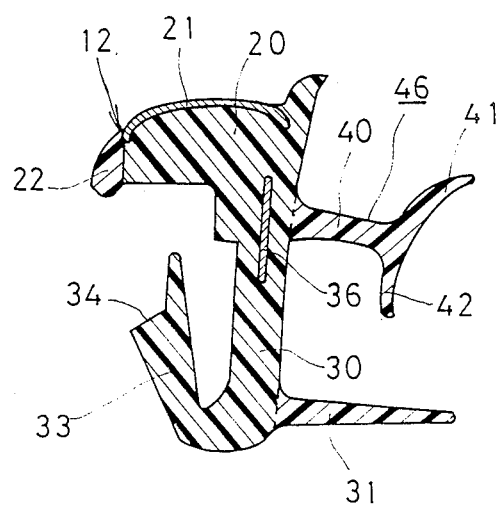

On the contrary, in case of a window molding 12 having a relatively thick upper projection 41, as shown in FIG. 6, the plate 40, the upper projection 41 and the lower projection 42 can be made of the same plastic material. However, preferably, these portions or elements are made of non-rigid plastics which are softer than the plastic materials of which the body of the leg portion is made, in view of the bending of the window molding at the corner portions of the window glass.

For easier deformation of the lower projection 42 toward the leg portion 21, it is possible to slightly incline the plate 40 downward from the leg portion 21.

Figure 5:
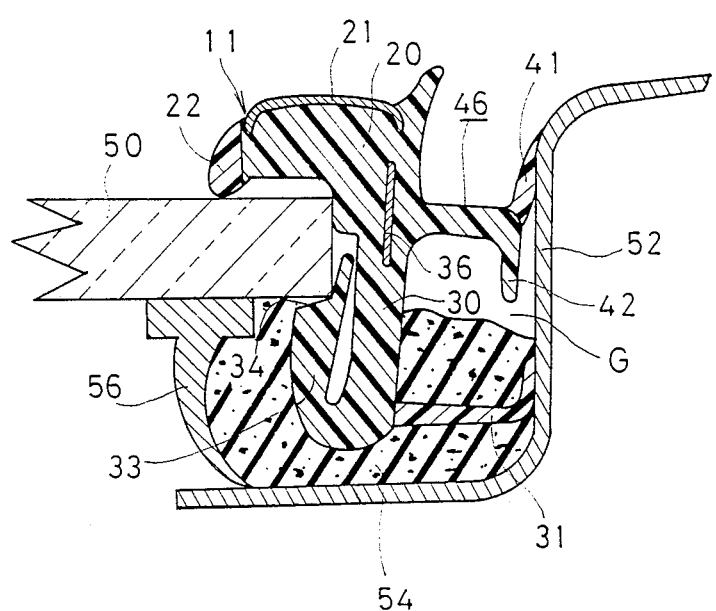
FIG. 5 is a sectional view of a window molding shown in FIG. 4, attached to a vehicle body; and, FIG. 6 is a sectional view of a window molding according to still another embodiment of the present invention.

FIG. 5 shows the window molding 11 which is mounted to the vehicle body. The securing leg portion 30 of the window molding 11 is press-fitted in the gap G between the window glass 50 and the vehicle body panel 52, so that the front end of the leg portion 30 is inserted and secured in the adhesive 54 in the gap G.

The stepped abutment 34 of the bent end 33 of the leg portion 30 comes into elastic contact with the end face of the window glass 50. The engagement of the stepped abutment 34 with the window glass 50 is enhanced by the elastic contact of the leg 31 of the leg portion 30 on the body panel side with the body panel 52.

The upper projection 41 which bears against the body panel 52 extends substantially upright, so that the generally U-shaped groove (gutter) 46 is defined between the upper projection 41 and the leg portion 30. Similarly to the above-mentioned first embodiment, when the window molding 11 is bent at the corner portions C of the window glass along the curved corner profile, the upper projection 41 can be snugly connected to the vehicle body panel 52 and the window glass 50 without a gap therebetween.

As a plastic material of which the window molding of the present invention can be advantageously used polyvinyl chloride, but not limited thereto, since the hardness or rigidity thereof can be easily modified by adjusting the amount of a plasticizer or the like to be added thereto.

I claim:

1. A window molding for installation in and covering a gap between a vehicle body panel and a window glass at the exterior of a vehicle to which the window molding is to be mounted, said window molding having a portion for extending external of said gap and along an edge and an exterior edge portion of said window glass and a securing leg portion integral with said external portion and spaced from said body panel for insertion into said gap for engagement with said window glass, the improvement comprising a plate member integral with said leg portion and extending outwardly from aside face of said external extending portion and said securing leg portion and away from said window glass and for contact with said vehicle body panel, said plate member having an end portion in elastic contact along an edge and exterior edge portion of said body panel, said side face of said external extending portion, said plate member and said end portion of said plate member forming a recessed portion extending between said window glass and said vehicle body panel and defining an external water receiving groove when said molding is installed in said gap.

2. A window molding according to claim 1, wherein said recessed external water receiving groove forms a generally U-shaped gutter for rainwater.

3. A window molding according to claim 1, wherein said window glass is directly adhered to the vehicle body panel by an adhesive embedded in the gap.

4. A window molding according to claim 1, wherein said bent end of said extending portion forms a projection extending upward and outwardly of said water receiving groove.

5. A window molding according to claim 5 wherein said extending portion has a lower projection in addition to said upward projection formed by said bent end.

6. A window molding for installation in and covering a gap between a vehicle body panel and a window glass at the exterior of a vehicle to which the window molding is to be mounted, said window molding having a portion for extending external of said gap and along an edge and an exterior edge portion of said window glass and a securing leg portion integral with said external portion and spaced from said body panel for insertion into said gap for engagement with said window glass, the improvement comprising a plate member integral with said leg portion and extending outwardly from a side face of said external extending portion and said securing leg portion and away from said window glass and for contact with said vehicle body panel, said plate member having an end portion in elastic contact along an edge and exterior edge portion of said body panel, said side face of said eternal extending portion, said plate member and said end portion of said plate member forming a recessed portion extending between said window glass and said vehicle body panel and defining an external water receiving groove when said molding is installed in said gap, said bent end of said extending portion forming a projection extending upward and outwardly of said water receiving groove, said extending portion having a lower projection in addition to said upward projection formed by said bent end, said lower projection being substantially opposed to said upper projection formed by said bent end, so that said extending portion and said upper and lower projections form, together with the leg portion, a generally H-shaped profile.

7. A window molding according to claim 1, wherein said window molding is made of a plastic material.

8. A window molding according to claim 7, wherein said bent end of said extending portion is made of a softer plastic material than the plastic material of which the remaining portion of the window molding is made.

9. A window molding according to claim 7, wherein said extending portion and said bent end of said extending portion are made of softer plastic materials than the plastic material of which the remaining portion of the molding is made.

10. A window molding according to claim 5, wherein said window molding is made of a plastic material.

11. A window molding according to claim 10, wherein said extending portion, said bent end of said extending portion and said lower projection of said extending portion are made of softer plastic material than the plastic material of which the remaining portion or the window molding is made.

* * * * *